(12) United States Patent
Ko

(10) Patent No.: US 7,046,591 B1
(45) Date of Patent: May 16, 2006

(54) TRACK TRAVERSE COUNTING ON AN OPTICAL DISK

(75) Inventor: Young-San Ko, SungNam-shi (KR)

(73) Assignee: CNS Co., Ltd., Suwon City (KR)

( * ) Notice: Subject to any disclaimer, the term of this patent is extended or adjusted under 35 U.S.C. 154(b) by 378 days.

(21) Appl. No.: 10/220,927

(22) PCT Filed: Jun. 12, 2000

(86) PCT No.: PCT/KR00/00612

§ 371 (c)(1),
(2), (4) Date: Nov. 26, 2002

(87) PCT Pub. No.: WO01/67445

PCT Pub. Date: Sep. 13, 2001

(30) Foreign Application Priority Data

Mar. 10, 2000 (KR) .............................. 2000-12032

(51) Int. Cl.
*G11B 7/00* (2006.01)
(52) U.S. Cl. ............................... 369/44.28; 369/30.13; 369/30.14
(58) Field of Classification Search ............. 369/44.28, 369/30.13, 30.14, 59.1, 44.25, 44.26, 53.29, 369/53.28
See application file for complete search history.

(56) References Cited

U.S. PATENT DOCUMENTS

| | | | | |
|---|---|---|---|---|
| 5,490,127 A | * | 2/1996 | Ohta et al. ................ | 369/47.51 |
| 5,684,771 A | * | 11/1997 | Furukawa et al. ....... | 369/53.23 |
| 5,767,639 A | | 6/1998 | Sakaguchi et al. | |
| 5,838,509 A | * | 11/1998 | Yun ............................. | 360/46 |
| 5,841,751 A | * | 11/1998 | Komazaki et al. ....... | 369/53.33 |
| 6,167,011 A | * | 12/2000 | Sun et al. ................. | 369/44.41 |
| 6,526,006 B1 | * | 2/2003 | Yoshimi et al. .......... | 369/44.28 |

FOREIGN PATENT DOCUMENTS

EP  0650 160 A1  4/1995
KR  1997-003128  11/1997

OTHER PUBLICATIONS

David F. Stout et al, Handbook of Operational Amplifier Circuit Design, McGraw-Hill Book Company.

* cited by examiner

*Primary Examiner*—W. R. Young
*Assistant Examiner*—Van Pham
(74) *Attorney, Agent, or Firm*—Jenkens & Gilchrist, P.C.

(57) ABSTRACT

An apparatus detects the number of tracks traversed on an optical disk. The apparatus includes a differentiation part for differentiating an output signal of a bandpass filter provided on an adjacent stage which eliminates a low DC component, a high frequency component and noise of an inputted modulation signal. A sample trigger generating circuit generates top and bottom signals in response to a data signal outputted through the differentiation part and a signal outputted through a comparator. A top hold part and a bottom hold part holds the data signal at top and bottom. A subtraction part performs a subtraction to obtain a difference between the top and bottom signals outputted from the top and bottom hold parts, thereby resulting in counting the number of the tracks traversed, while increasing a jumping speed required for a detection of the number of the tracks traversed.

3 Claims, 5 Drawing Sheets

TRACK TRAVERSE COUNTING ON AN OPTICAL DISK

BACKGROUND OF THE INVENTION

1. Field of the Invention

The Present invention relates to an apparatus for detecting the number of a track traverse on an optical disk, and more particularly, to an apparatus for detecting the number of the track traverse on an optical disk, which is capable of improving a speed of detecting the number of the track traverse.

2. Discussion of Related Art

In general, a disk playback apparatus used for reproducing information written on a digital audio disk is constructed to reproduce a program information placed on a temporary position by using an address information or a TOC (Table of Content) on a disk.

In this disk playback apparatus, data inputted to the disk in a unit of track is reproduced in sequence. However, there is a case that according to a necessity and by an intention of a user, he/she wants to select a desired temporary spot on the disk in order to reproduce the address information on the selected spot, instead of reproducing in a recorded sequence the program information that is in the disk. Like this, in the case of reproducing the address information on the desired temporary spot of the disk, it requires such an operation that the selected spot is determined as the pick-up position by a pick-up means. Such operation for determining the pick-up position is generally defined as a search operation.

A track search operation in a conventional optical disk playback apparatus is described as follows:

First, the pick-up position by the pick-up means is rapidly moved by a given distance in a direction of crossing a written track of the disk, and then, a normal playback state becomes to thus pick up the address information. Subsequently, the pick-up position by the pick-up means is obtained from the picked-up address information, and an operation for obtaining a difference between the pick-up position and a target position is performed repeatedly till the target spot is searched. That is, for moving the pick-up means at a high speed, the pick-up operation of picking up the address information is performed, thereby executing intermittently an operation that the pick-up position by the pick-up means is rapidly moved by a given distance in a direction of crossing the written track of the disk and then to gradually close to the target spot.

However, in such conventional track search operation, the address information should be picked up in the midst of the rapid movement to the pick-up position by each pick-up means to obtain a current position and a difference between the current position and the target position. Therefore, conventional track search operation had a difficulty in achieving a high-speed search.

Meantime, in other method of searching the tracks of an optical disk, a track traverse signal is detected from a track within the optical disk to count the number of tracks on which an optical head traverses, and the counted numbers are used as a reference for a moving distance of the optical head to the target position. However, when the optical head moves rapidly for a high-speed search, there occurs a case that the optical head is not passed on a pit array provided within the disk track to detract an accuracy of the track traverse signal. Such phenomenon occurs particularly seriously when frequency of the track traverse signal is ⅓ or more of signal frequency of the optical disk in proportion to the moving speed of the optical head, which cause a serious intermittence of the track traverse signal.

Therefore, in order to realize a stabilized slide jump capable of settling the above problems, the moving speed of the optical head is limited, or instead of the track signal, a signal generated from equipment as a specific scale is used as the reference signal for the moving distance of the optical head. But, in the former case, a slide jump time is lengthened relatively, and in the later case, an accurate track movement is difficult due to a limitation of an accuracy of the scale.

FIG. 1 shows an apparatus for detecting the number of the track traverse on the optical disk according to a conventional method, in which another search operation is described.

Referring to FIG. 1, a data signal read by a general pick-up means in a movement of an optical head is transferred to a bandpass filter 1 to eliminate a low DC component, a high frequency component and noise. The data signal passed through the bandpass filter 1 is inverted in its polarity by an inverter 2, subsequently is passed through a first amplifier 3, a first diode D1, a second amplifier 4, a first capacitor C1, a first resistance R1, a second capacitor C2 and a second resistance R2, and then outputted to an output terminal a. The data signal inverted in its polarity by the inverter 2 is also outputted to an output terminal b via a third amplifier 5, a second diode D2, a forth amplifier 6, a third capacitor C3, a third resistance R3, a forth capacitor C4 and a forth resistance R4.

Subsequently, the data signals outputted to the output terminal a, b are calculated for a difference therebetween in a subtracter 7 and the number of the traversed tracks is then counted in a counter 8. Though, it is not shown in the drawing, the counted number of the traversed tracks is sent to a controller performing a search operation.

FIG. 2 depicts waveform of an output signal detected in the output terminal a, b versus the inputted data signal, in the apparatus for detecting the number of the track traverse on the optical disk in FIG. 1. In the apparatus for detecting the number of the track traverse on the disk, generally a charge is performed by the inputted data signal, and a discharge is performed by a capacitor and a resistance($\tau$=RC, in which $\tau$ is a discharge rate).

At this time, in the case of trying to increase the discharge rate by decreasing $\tau$, as shown in FIG. 3, it is apparent that the waveform of the output signal detected in the output terminals a, b is very unstable in comparison with an ideal result. In the case of trying to decrease the discharge rate by increasing $\tau$, as shown in FIG. 4, it can be understood that the waveform of the output signal detected in the output terminal a, b is very unstable.

As described above and shown FIGS. 3 and 4, in the conventional method, the output waveform of the output terminals is unstable when the jumping speed is increased to perform a high speed search. That is, a subtraction of the data signals through the subtracter is impossible since the output waveform of the output terminal is unstable. Therefore, the high-speed search for the number of the track traverse on the optical disk is difficult.

SUMMARY OF THE INVENTION

Accordingly, the present invention is directed to an apparatus for detecting the number of the track traverse on an optical disk being capable of eliminating one or more of the limitations and disadvantages of the prior art.

A primary object of the invention is to provide an apparatus for detecting the number of the track traverse on an optical disk, which is capable of settling the above-mentioned problems.

Another object of the invention is to provide an apparatus for detecting the number of the track traverse on an optical disk, in which a high- speed search operation can be obtained with an exact detection of the number of the track traverse, while a jumping speed is increased.

To achieve these and other advantage, and in accordance with the purpose of the invention, the apparatus for detecting the number of the track traverse on the optical disk is characterized by: a differentiation part for differentiating a data signal outputted from a bandpass filter, the differentiation part being provided on a stage next to the bandpass filter for eliminating a low DC component, a high frequency component and noise an inputted data signal; a sample trigger generating circuit for generating top and bottom signals in response to the data signal outputted through the differentiation part and a signal outputted through first and second comparators; a top hold part and a bottom hold part for holing the data signal at top and bottom; a subtraction part for performing subtraction to obtain a signal difference between the top and the bottom hold signals the top hold and bottom hold parts; and a third comparator for performing a binarization for the signal difference of the top and bottom hold parts outputted through the subtraction part.

BRIEF DESCRIPTION OF THE ATTCHED DRAWINGS

The invention will be better understood and its numerous objects and advantages will become more apparent to those skilled in the art by reference to the following drawings, in conjunction with the accompanying specification, in which.

Figure 1:
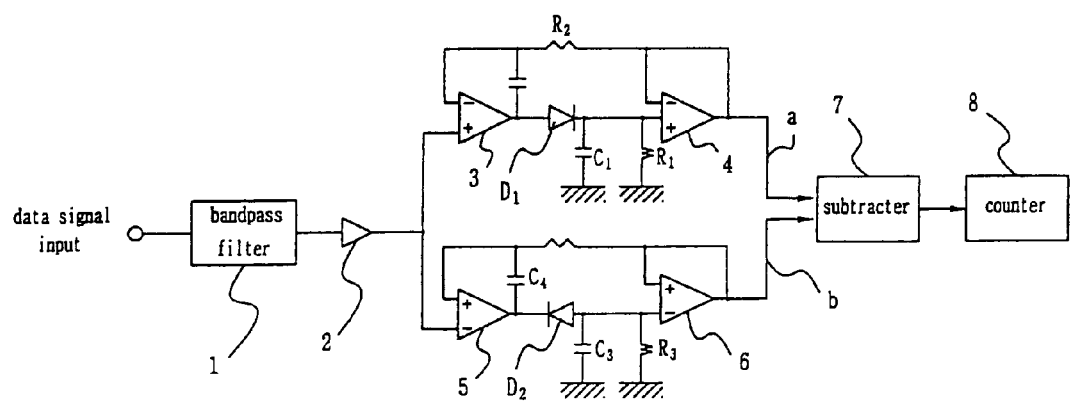
FIG. 1 shows a block diagram of an apparatus for detecting the number of the track traverse on an optical disk according to a conventional method.
Figure 2:
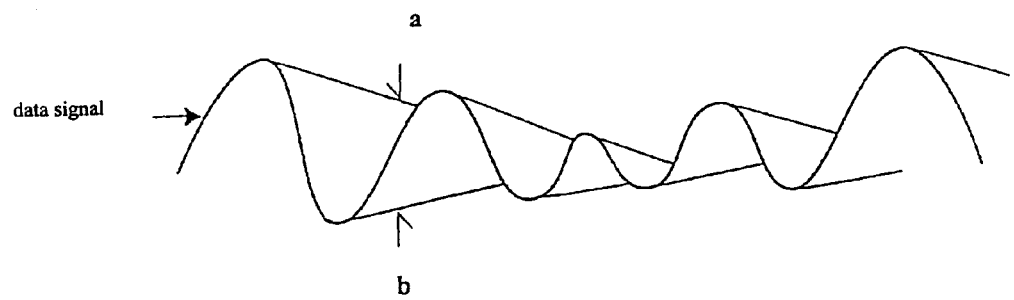
FIG. 2 represents output signal waveform for an input signal to the track traverse detecting apparatus on the optical disk shown in FIG. 1.
Figure 3:
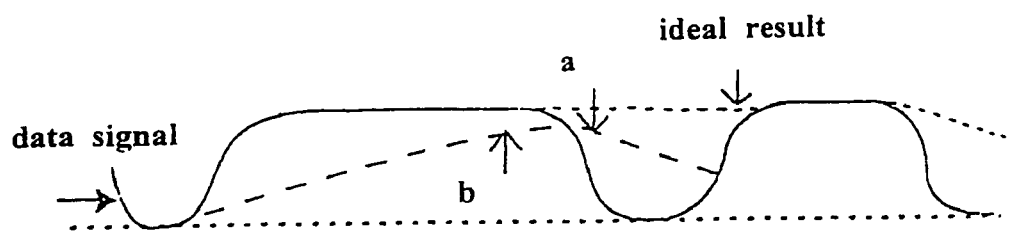
Figure 4:
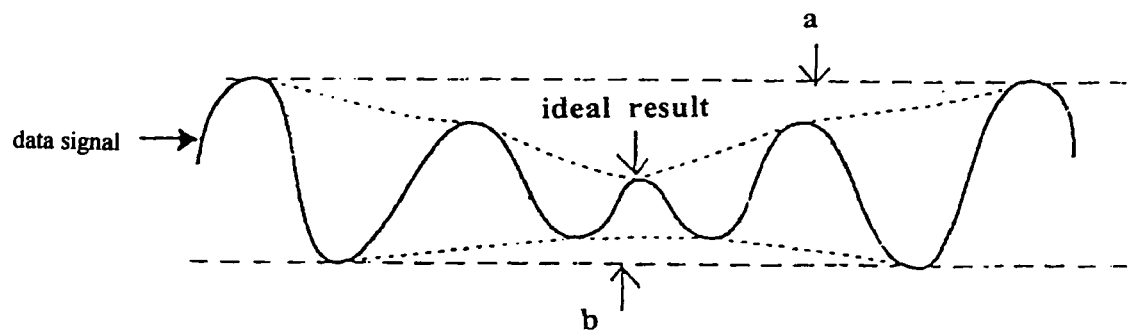
Figure 5:
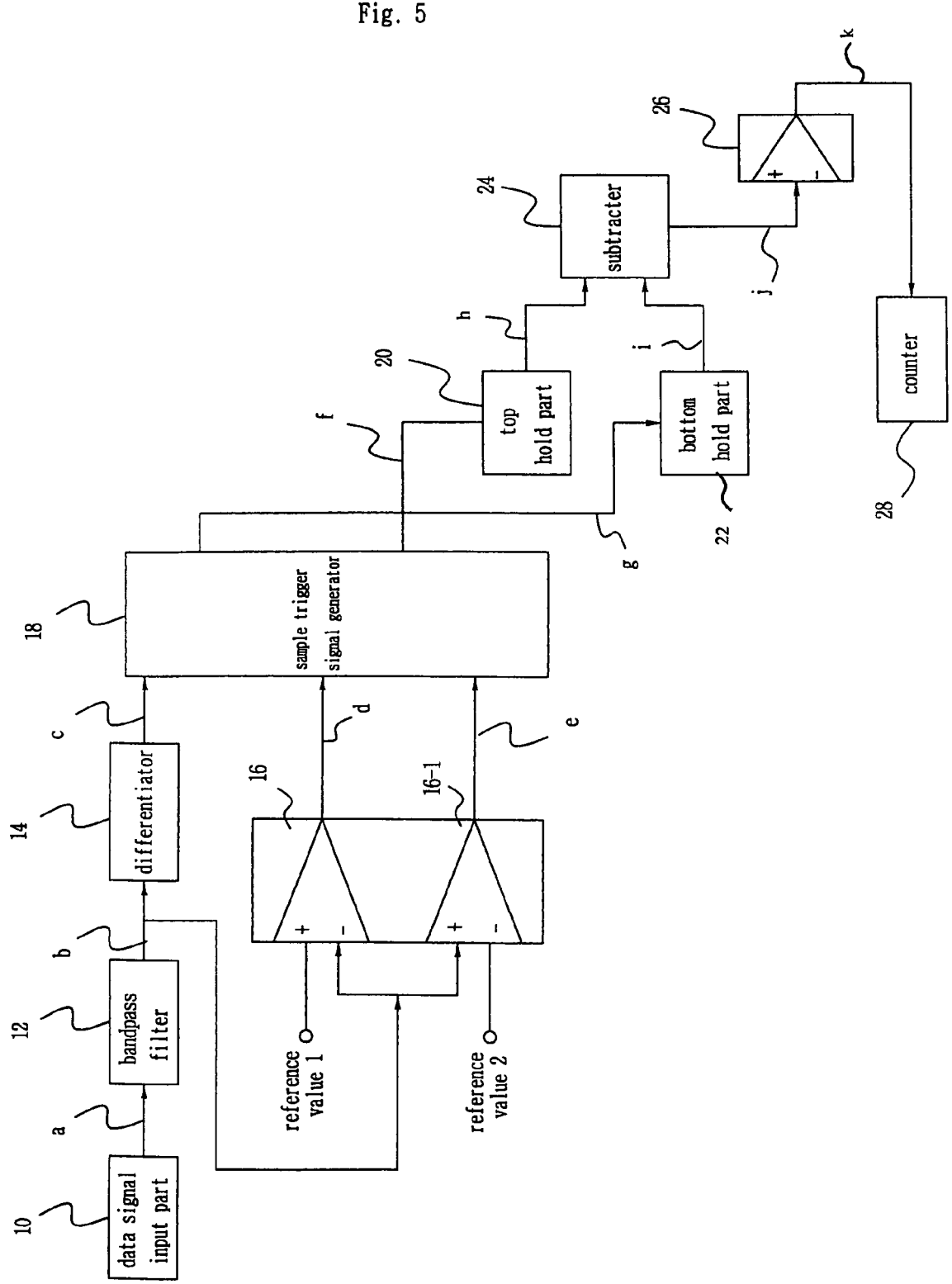
Figure 6:
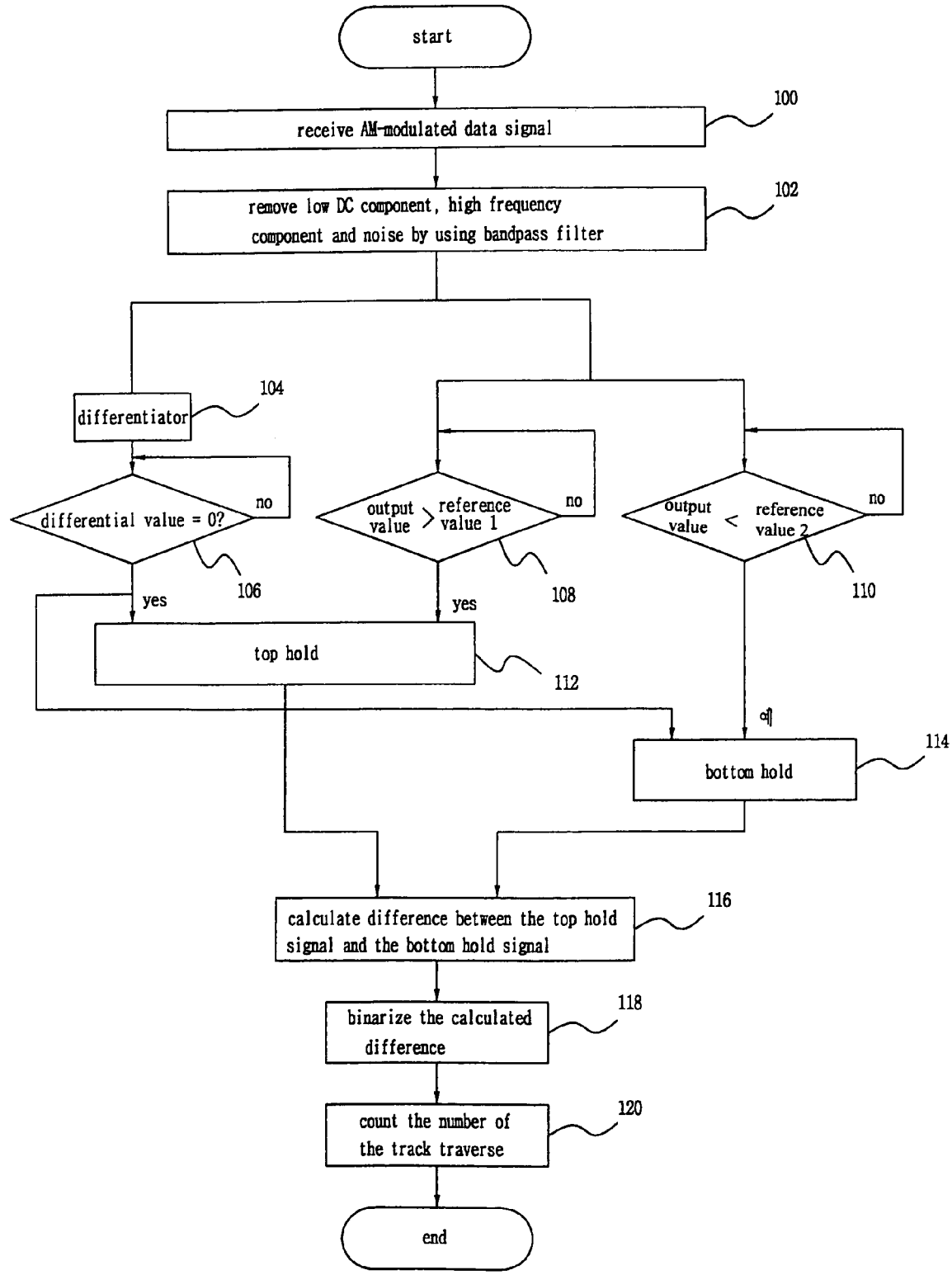
Figure 7:
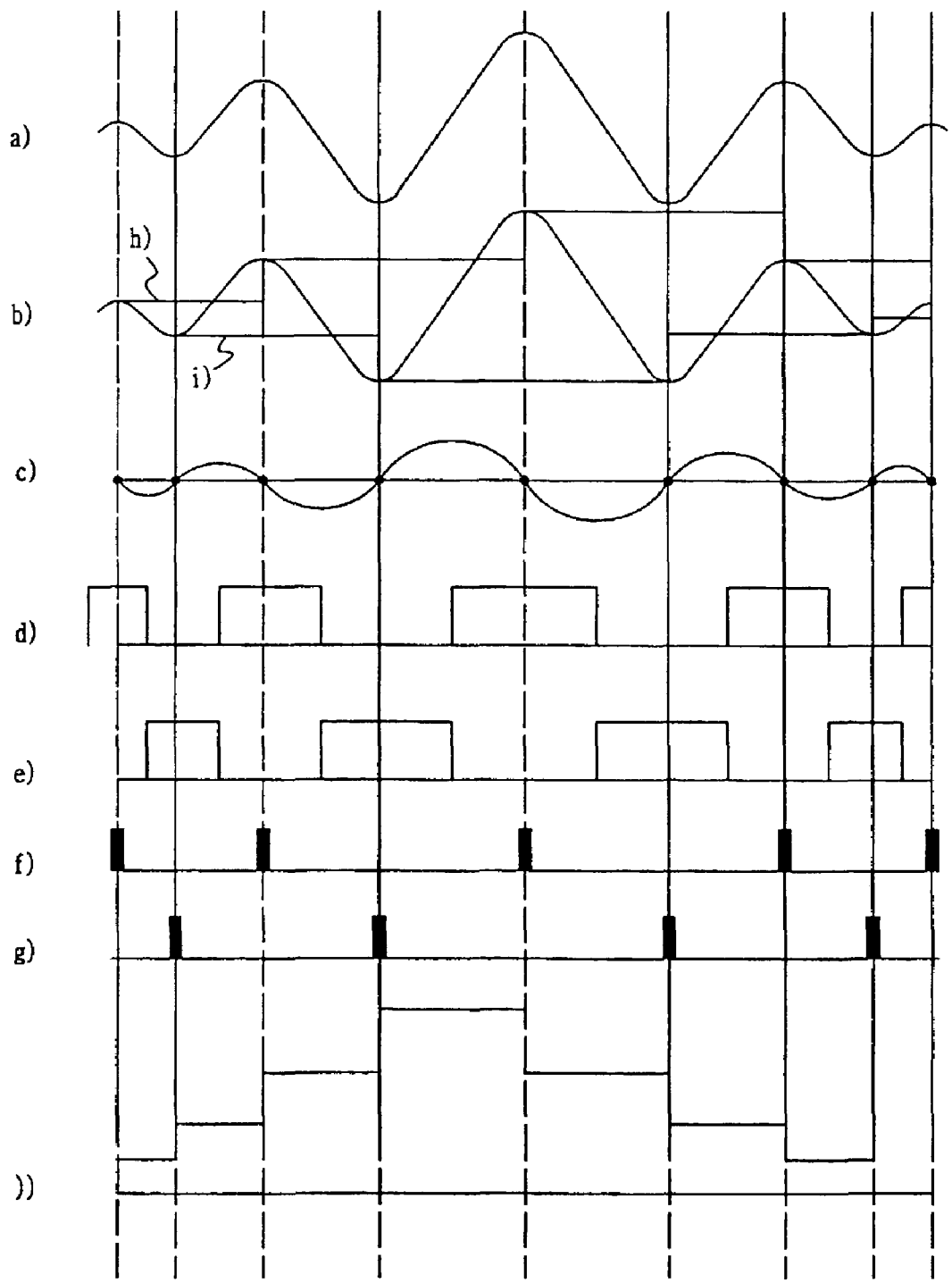

FIG. 3 indicates output waveform when a discharge rate is increased in the track traverse detecting apparatus on the optical disk shown FIG. 1;

FIG. 4 depicts output waveform when a discharge rate decreased in the track traverse detecting apparatus on the optical disk shown in FIG. 1;

FIG. 5 illustrate a block diagram showing an apparatus for detecting the number of the track traverse on an optical disk in accordance with the preferred embodiment of the present invention;

FIG. 6 illustrates a flowchart showing a procedure of detecting the number of the track traverse on the optical disk in accordance with the preferred embodiment of the present invention; and FIG. 7 shows a waveform outputted from each of blocks contained into an apparatus for detecting the number of the track traverse on the optical disk shown in FIG. 5.

DETAILED DESCRIPTION OF PREFERRED EMBODIMENT

Reference will now be made in detail to the preferred embodiment of the present invention, examples of which are illustrated in the accompanying drawings.

FIG. 5 illustrate a block diagram showing an apparatus for detecting the number of the track traverse on an optical disk in accordance with the inventive preferred embodiment, and FIG. 7 depicts waveform outputted from each of the blocks of the track traverse detecting apparatus on the optical disk shown in FIG. 5.

With reference to FIGS. 5 and 7, a data signal read in a data signal input part 10 is passed through a bandpass filter 12 to eliminate a low DC component, a high frequency component and noise. A data signal (d) passed through the bandpass filter 12 is passed through a differentiation part 14 which is one of kernel construction in the invention. Meantime, in the case of the data signal outputted from the bandpass filter 12 being larger than a reference value 1, a first comparator 16 is activated, and in the case of the inputted data being smaller than a reference value 2, a second comparator 16-1 is activated.

Output values f, g from the first and second comparator 16, 16-1 are inputted to a sample trigger generating part 18, wherein an output data (e) of the differentiation part is '0' and an output value from the first comparator 16 is 'high', a signal (h) for activating a top hold part 20 is generated, and when an output value from the second comparator 16-1 is 'high', a signal (i) for activating a bottom hold part 22 is generated. At this time, the top hold part detects and holds an upper vertex of the data signal outputted through the data signal input part 10, and the bottom hold part 22 detects and holds a lower vertex of a signal outputted through the data signal input part 10.

Consecutively, data signals j, k outputted from the top hold part 20 and the bottom hold part 22 are computed for the data signal difference therebetween by a subtraction part 24. The data signal difference 1 of the top hold part 20 and the bottom hold part 22, which is outputted through the subtraction part 24, is binarized in a third comparator 26, i.e., it becomes 'high' if the data signal difference is higher than a predetermined reference value, and it becomes 'low' if the data signal difference is smaller than the reference value. Thereby, the number of the traversed tracks is counted by a counting part 28, and then, the counted number is sent to a controlling part performing a search operation.

Disclosed are detailed circuit diagrams for the bandpass filter 12, the differentiation part 14, the sample trigger signal generating part 18, the top hold part 20, the bottom hold part 22 and the subtraction part 24, in "Handbook of Operational Amplifier Circuit Design" by Davis F. Stout Milton Kaufman.

FIG. 6 depicts a flowchart showing a procedure of detecting the number of the track traverse on an optical disk in accordance with the inventive preferred embodiment.

In FIG. 6, in a step 100, a data signal AM-modulated is inputted through the data signal input part 10, and in step 102 a low DC component, a high frequency component and noise of the inputted data signal is removed in the bandpass filter 12. In a step 104, the data signal in which the low DC component, the high frequency component and the noise are removed in the step 102, is only passed through the differentiation part, and in a step 106 it is determined whether the outputted differentiation value is '0'. In case the outputted differentiation value is not '0' the step 106 is repeated, and in the case of '0', it is passed to a step 112.

While, in a step 108 it is determined whether an output value from the first comparator 16 is larger than a reference value 1 and if the output value is larger than the reference value 1, it is passed to the step 12. In a step 110, it is also checked whether an output value from the second comparator 16-1 is smaller than a reference value 2, and if smaller, it is passed to a step 114. In the step 112, the data signal is top held when the differentiation value is '0' in the step 106 and the output value from the first comparator 16 is larger than the reference value in the step 108. In the step 114, the data signal is bottom held when the differentiation value is '0' in the step 106 and the output value from the first comparator 16-1 is smaller than the reference value 2 in the step 110.

A difference between the top hold value and the bottom hold value of the data signal is calculated in a step 116, and the calculated value is binarized in a step 118. The number of the track traverse is counted in the counting part 28 in a step 120.

As described above, in accordance with the invention, an apparatus for detecting the number of the traversed tracks on an optical disk is comprised of: a differentiation part for differentiating an output signal of a bandpass filter provided on the stage next to the bandpass filter which eliminates a low DC component, a high frequency component and noise of an input data: a sample trigger generating circuit for generating top and bottom signals in response to a data signal outputted from the differentiation part and a signal outputted from a comparator; a top hold part and a bottom hold part for holding the data signal at top and bottom; and a subtraction part for performing a subtraction to obtain a difference between the top signal and the bottom signal outputted from the top and bottom hold parts: By this construction, the exact number of the traversed tracks can be counted, while a jumping speed required for a detection of the track traverse on the optical disk is can be increased.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the sprit of the invention as set forth and defined by the following claims.

What is claimed is:

1. An apparatus for detecting the number of the tracks traversed on an optical disk, comprising:
    a differentiation part for differentiating a data signal outputted from a bandpass filter, said differentiation part being provided on a stage next to the bandpass filter for eliminating a low DC component, a high frequency component and noise of an input data signal;
    a sample trigger generating circuit for generating top and bottom signals in response to a data signal outputted through the differentiation part and a signal outputted through first and second comparators;
    a top hold part and a bottom hold part for holding the data signal at top and bottom;
    a subtraction part for performing a subtraction to obtain a signal difference between the top hold signal and the bottom hold signal outputted from the top and bottom hold parts; and
    a third comparator for performing a binarization of the signal difference value of the top and bottom hold parts outputted from the subtraction part.

2. The apparatus of claim 1, further comprising a counting part for counting the number of the tracks traversed by using an output result from the third comparator.

3. The apparatus of claim 1, wherein the number of the tracks traversed counted by said counting part is transferred to a controlling part.

* * * * *